US010087818B2

(12) United States Patent
Ocampo et al.

(10) Patent No.: US 10,087,818 B2
(45) Date of Patent: Oct. 2, 2018

(54) ENGINE BLOCK AND A PROCESS FOR HYBRID IGNITION OF AN ENGINE

(71) Applicants: Paul Jermyn D. Ocampo, Tarlac (PH); Peter Selwyn D. Ocampo, Caroline Springs (AU)

(72) Inventors: Paul Jermyn D. Ocampo, Tarlac (PH); Peter Selwyn D. Ocampo, Caroline Springs (AU)

( * ) Notice: Subject to any disclaimer, the term of this patent is extended or adjusted under 35 U.S.C. 154(b) by 163 days.

(21) Appl. No.: 15/129,384

(22) PCT Filed: Mar. 26, 2015

(86) PCT No.: PCT/AU2015/000185
§ 371 (c)(1),
(2) Date: Sep. 26, 2016

(87) PCT Pub. No.: WO2015/149109
PCT Pub. Date: Oct. 8, 2015

(65) Prior Publication Data
US 2017/0107894 A1  Apr. 20, 2017

(30) Foreign Application Priority Data

Mar. 29, 2014  (AU) ............................. 2014901133
Jun. 7, 2014  (AU) ............................. 2014902178

(51) Int. Cl.
*F02B 25/00* (2006.01)
*F02B 23/00* (2006.01)
*F02B 75/04* (2006.01)
*F02B 19/04* (2006.01)
*F01L 11/02* (2006.01)
(Continued)

(52) U.S. Cl.
CPC ............... *F02B 19/04* (2013.01); *F01L 1/38* (2013.01); *F01L 11/02* (2013.01); *F01L 25/066* (2013.01)

(58) Field of Classification Search
CPC ..... F02B 19/04; F01L 11/02; F01L 1/38; F01L 25/066
USPC ......... 123/65 S, 65 VC, 73 F, 73 FA, 73 AE, 123/48 D
See application file for complete search history.

(56) References Cited

U.S. PATENT DOCUMENTS 2,224,229 A * 12/1940 Miller .................. F01P 1/02
123/41.33
5,009,207 A * 4/1991 Merritt .................. F02B 19/04
123/260
2007/0089694 A1* 4/2007 Hacsi .................. F02B 19/1066
123/48 D

FOREIGN PATENT DOCUMENTS

GB       159271 A    2/1921
GB       337248 A    10/1930
GB      2232718 A    12/1990

OTHER PUBLICATIONS

International Search Report and Written Opinion for Application No. PCT/AU2015/000185 dated Jun. 25, 2015 (13 pages).

* cited by examiner

*Primary Examiner* — Syed O Hasan
(74) *Attorney, Agent, or Firm* — Michael Best & Friedrich LLP

(57) ABSTRACT

An engine block comprising: a combustion chamber, an inlet for introducing a fuel/air mixture into the combustion chamber and an outlet for expelling combusted fuel/air mixture from the combustion chamber; and a piston that reciprocates within the combustion chamber to compress the fuel/air mixture therein, the piston having a closer supported (Continued)

thereon, wherein reciprocating movement of the piston seals the combustion chamber with the closer.

16 Claims, 13 Drawing Sheets

(51) Int. Cl.
*F01L 1/38* (2006.01)
*F01L 25/06* (2006.01)

Intake

Compression

ENGINE BLOCK AND A PROCESS FOR HYBRID IGNITION OF AN ENGINE

FIELD OF THE INVENTION

The invention relates generally to internal combustion engines, and more particularly to an engine block and a process for hybrid ignition of an engine.

BACKGROUND

Our reliance on the use of crude oil as a source of relatively cheap energy is ever increasing. Developed and developing countries continue to consume record volumes of this limited resource to sustain their economy. At the same time the impact to the environment, in the form of air pollution and greenhouse gases, is alarming.

Oil deposits are being depleted at a high rate and demand is still expected to grow as nations' requirement for energy continues to increase. According to industry experts, the use of motor vehicles as a mode of transportation contributes to more than 10% of all greenhouse gases emitted to the environment. The number may not imply a significant figure when compared to other contributing factors but combined with the fact that the oil required to power these vehicles is dwindling in quantity, and the growing risk of accelerating the greenhouse effect, it is important to identify methods to run vehicles more efficiently.

Although alternative methods to power motor vehicle are becoming available, a large percentage of cars on the roads today are still powered by internal combustion engines. The use of an internal combustion engine is possibly the least efficient way to power a vehicle. Most engines were designed during the time when fuel was abundant and the effects of pollution and emission were not a major concern.

An internal combustion engine is theoretically a heat pump. The efficiency of a heat pump is measured by its ability to produce work (output) relative to the heat used (input). The input is generally derived from the combustion of fossil fuels. Output is measured as the mechanical work produced to propel wheels of the vehicle minus the losses incurred in the process.

There are several factors that can contribute to the efficiency of an engine: combustion, heat transfer, friction, type of fuel, exhaust gas scavenging and ignition process. While not all of these factors can be addressed in a single solution, aspects of the implementation of an internal combustion engine could certainly be improved.

There are a large number of notable enhancements to the design of the internal combustion engine during the last 30 years. Development in technologies related to metallurgy, chemistry and electronics has allowed engineers and designers to reduce some issues with losses. Improvements in manufacturing processes have similarly contributed in producing finely tuned engines with higher operating efficiencies.

A typical engine design employs a combination of openings, ports and valves to facilitate the flow of air/fuel and other gases in and out of a combustion chamber. On typical two-stroke engines, openings on the cylinder wall are used as intake and exhaust passages. In contrast, typical four-stroke engines utilise ports in combination with valves to control the flow of fluids in and out of the combustion chamber.

There are a number of drawbacks with these traditional methods. For example, in a two-stroke engine, the exhaust gases from the combustion chamber are not expelled fully as they cannot flow freely out of the combustion chamber. This leaves combusted air/fuel in the combustion chamber further reducing the efficiency of any subsequent combustion therein. Even with modern two-stroke engines the combination of openings and port utilised produces losses that drive efficiency down.

Due to their simplicity two-stroke engines have less moving parts than four stoke engines; however, their simplicity limits the positioning of certain components. In contrast a four-stroke engine does not suffer from the same limitations in positioning components but the added componentry introduces further efficiency losses to the complexity of the engine. For example, actuating a valve requires a number of additional mechanical components. For every component introduced, extra losses are incurred. Furthermore, these valves can introduce geometric limitations to the port locations on the cylinder head. This results in the losses from inefficient exhaust gas scavenging, which is apparent with typical engine designs.

The most popular types of engines are the petrol (Homogenous Charge Spark Ignition—HCSI) and diesel (Stratified Charge Compression Ignition—SCCI) engine. While they are not highly efficient engines by design, both are widely used because they are well understood and their implementation is cost effective. The petrol and diesel engine both have their own limitations and are not the most frugal to run.

While advancement in automotive technology contributes incremental improvements, it would be desirable to further improve the running efficiency of engines. To this end a hybrid ignition system, referred to as Homogeneous Charge Compression Ignition (HCCI) engine has emerged, offering improvements over typical HCSI and SCCI engines.

HCCI is essentially a variation of an Otto engine and operates similarly to a petrol engine except for the method of ignition. HCCI is a combination of the two combustion strategies applied in gasoline and diesel engines, in which ignition is achieved by compressing the air/fuel mixture in the cylinder until it spontaneously ignites.

The implementation of HCCI on internal combustion engines is highly desirable as estimates from industry indicate efficiencies of around 45% are achievable and with further development this could reach the 60% industry target.

The thermochemical reaction during combustion in HCCI is preferred because it is achieved at a lower temperature. This is advantageous as it reduces the production of NOx and soot. HCCI also runs on a lean fuel and with a high compression ratio, which equates to lower fuel consumption and higher output power. HCCI engines, due to the ignition process are capable of running on petrol (gasoline), diesel and other fuel mixtures.

However, the HCCI ignition process is not without drawbacks. First, it tends to be problematic and difficult to control. The mixture of air and fuel can auto-ignite anytime should the right conditions occur in the cylinder. Secondly, the pressure in the HCCI cylinder is also high compared to a typical HCSI engine which can result in heavy engine wear and a risk of potential engine failure. Thirdly, the HCCI ignition process can result in increased carbon monoxide (CO) and hydrocarbon (HC) emissions due to incomplete oxidation during the combustion process.

Typical HCCI engines are prone to quality control issues such as detonation, which has a negative impact on the engine's performance and reliability. Diesel engines typically counter detonation by introducing the fuel to the fuel air mixture very late in the piston stroke, immediately prior to ignition thereby reducing allowable time in which detonation can occur.

Detonation can reduce the effective operating range of an engine while operating in HCCI mode. At the low end of the engine operating range, detonation results in poor response due to lack of available torque and at the high end of the operating range the probability of detonation increases.

The term "detonation" is understood herein to refer to is the spontaneous detonation combustion of air and fuel mixture outside the prescribed ignition point in the engine cycle. Detonation is also referred to pinging, pinking or engine knock.

The impact of this detonation ranges from minor to major depending on when it occurs and the extent of the event. The shockwave created during detonation exhibits a distinctive "ping" sound, which is produced by the standing waves bouncing within the cylinder. The impact of engine knock is minimal if the amount of air/fuel mixture constitutes only of a small percentage of the total volume of gases in the cylinder. If the air/fuel mixture constitutes a substantial proportion of the total volume of gases in the cylinder, the excessive pressure developed during detonation can destroy components of the engine and result in engine failure.

The effect of detonation also affects the overall performance of the engine. Detonation prevents the engine from delivering the required power at higher operating speeds. It can also diminish engine responsiveness at the low end of the operating range due to reduced torque. As the engine is loaded or worked harder, the tendency for detonation to occur is increased as a result of higher pressure in the cylinders.

As global consumption of fossil fuels increases, a viable method of operating an internal combustion engine is through the implementation of HCCI. Combustion in a HCCI engine occurs when the mixture of air and fuel in the combustion chamber is compressed until the components of the mixture spontaneously react and ignite. The increase in pressure in the combustion chamber (ie decrease in volume) increases the temperature of the air/fuel mixture forcing the mixture to combust. Due to the nature of this type of ignition, it is inherently difficult to predict and control the exact point in time when this event occurs.

The composition of the fuel/air mixture also affects the ignition process. Varying the octane rating of a fuel can vary the point of ignition in the process. Similarly, the amount of external gases introduced in the combustion chamber can influence the ignition event. The combination of all of these elements creates a challenge for controlling the exact point at which ignition will occur. Control of the ignition event is important as this is the primary mechanism used to manipulate the response and power delivery of an engine.

Attempts to control ignition in a HCCI engine exploit the different parameters that influence the ignition event: temperature, pressure, external gases and composition of the fuel. These parameters can be manipulated to either delay or advance the ignition point. However, the management of the above variables across the operating parameters of the engine requires a very complex algorithm. A computerised electronic control system can provides a solution but the cost involved is prohibitive for most commercial purposes.

There is a need to deliver an effective method of operating a HCCI engine, of controlling the ignition event, reducing emissions and reducing the probability of detonation.

In light of the above drawbacks it would be advantageous to provide a more efficient means of implementing an HCCI internal combustion engine.

SUMMARY

In accordance with the present invention there is provided an engine block comprising: a combustion chamber, an inlet for introducing a fuel/air mixture into the combustion chamber and an outlet for expelling combusted fuel/air mixture from the combustion chamber; and a piston that reciprocates within the combustion chamber to compress the fuel/air mixture therein, the piston having a closer supported thereon, wherein reciprocating movement of the piston seals the combustion chamber with the closer.

The closer may seal the combustion chamber by sealing the outlet. The closer may seal the combustion chamber by sealing a separator disposed between the piston and the outlet.

The separator may be adapted to move back and forth within the combustion chamber.

The piston may reciprocate between a first and a second position, which respectively drives the closer into and out of engagement with the outlet of the combustion chamber.

The closer may be a spigot upstanding from a head of the piston. The spigot may be integrally formed with the piston. The spigot may be driven into engagement with the outlet to plug the outlet and thereby physically seal the combustion chamber.

The combustion chamber may further comprise a guide, the guide at least partially circumventing the outlet. The guide may receive the closer as the piston moves towards the first position. The guide may be tapered, having a widened section directed toward the oncoming closer, to guide the closer into sealing engagement with the outlet.

The engine block may further comprise an ignition source within the combustion chamber.

The outlet may be centrally disposed in an upper portion of the combustion chamber.

The inlet may be disposed in a sidewall of the combustion chamber.

The invention provides an improved mechanism to shut the exhaust port of the combustion chamber, as the spigot for sealing the exhaust port of the combustion chamber is connected directly to the piston.

The invention further provides an efficient engine by reducing losses due to complexity, friction and exhaust gas scavenging ie the ease and flow of the combusted air/fuel mixture as it is drawn out of the combustion chamber to be replaced by unburned fuel/air mixture.

The invention provided herein utilises a simple yet effective mechanism to seal the exhaust port of the combustion chamber. The use of the spigot replaces a valve or series of valves. The spigot mechanically serves to confine fluids in the chamber and effectively reduces losses attributed to valves and valve actuator systems. As such the need for complex mechanical components to actuate the valves is reduced if not eliminated thereby reducing frictional losses.

When the exhaust port of the combustion chamber is located centrally to the cylinder head, further benefits are realised during scavenging. This alignment of the exhaust port allows gases to be expelled effectively when the piston moves towards the port. The pressure generated in this movement assists in pushing the exhausted gases out of the combustion chamber. The configuration of the exhaust port and spigot taught herein increases the efficiency of the engine and further provides improved cooling due to improvements in exhaust gas scavenging.

The term "scavenging" is understood herein to refer to the process of pushing or drawing exhausted gas-charge out of a cylinder and replacing the spend gas-charge with fresh, unused air/fuel mixture to charge the subsequent piston stroke.

Furthermore, the invention provides further advantage when applied to small scale engines. In particular with nitro engines (nitro-methane/methanol) such as those used in hobbyist model vehicles and drag racing vehicles. In these applications, power is improved due to the reduction of losses in the engine operation in combination with the effective scavenging of exhaust gases.

In accordance with a further aspect of the present invention there is provided an engine block comprising a combustion chamber, an inlet for introducing a fuel/air mixture into the combustion chamber and an outlet for expelling combusted fuel/air mixture from the combustion chamber; a piston that reciprocates within the combustion chamber to compress the fuel/air mixture therein; and a reciprocating separator that separates the combustion chamber into a primary chamber and a secondary chamber; wherein the primary chamber is provided with an ignition source to initiate combustion in the primary chamber, which moves the separator to compress and spontaneously combust the fuel/air mixture in the secondary chamber to drive the piston.

The separator may contain an aperture through which fuel/air mixture communicates between the secondary chamber and the primary chamber.

The piston may support a closer that seals the secondary chamber by engaging the aperture.

The separator may be configured to operably slide along the closer, to inversely vary a volume of the primary chamber with respect to a volume of the secondary chamber.

The separator may be driven toward the piston by expansion of the combusting air/fuel mixture within the primary chamber.

Engagement between the closer and the reciprocating separator may seal the primary chamber from the secondary chamber.

An ignition source may be disposed within the primary chamber.

The inlet may further comprise a valve, wherein variation of pressure within the combustion chamber moves the valve between an open position and a closed position. The inlet may be disposed within the piston.

The ignition process and mechanism according to the present disclosure provides an effective means of controlling ignition in a HCCI engine. It allows for a successful initiation of combustion in the cylinder while delivering all the advantages of HCCI. The combination of the process and the mechanical instruments resolves issues across the ignition event. It also presents an advantage in reducing the possibility of detonation in the cylinder. As an outcome, the engine delivers more power and operates efficiently over a wider operating range. The current invention applies to all types of internal combustion engines.

There are a number of elements required in the combustion process of fuel. To achieve combustion, the mixture of air and fuel in the cylinder must be ignited. This can be initiated by a number of methods—introduction of flame or spark, compression of the mixture by reduction in volume, compression of mixture by induction or by increasing the temperature of the mixture. Inside the combustion chamber, pressure, temperature and volume elements are all at play and are governed by the laws of thermodynamics.

In one embodiment of the invention, spark ignition (SI) and HCCI are used to facilitate combustion of gases in the cylinder. SI can be used to initiate the primary ignition while HCCI is employed for the main combustion to generate power in the engine. SI method is a mature ignition methodology which can be employed with less complexity.

In another embodiment, a separator is used to divide the combustion chamber into two distinct enclosures—a primary chamber (PC) and a secondary chamber (SC). The separator is constructed to have a port or a plurality of ports which act as passageways to allow gases to flow between the two enclosures.

At a minimum, the ratio of the split in volume between the PC and SC is 1:1. Based on estimates this can be increased to 1:9 and beyond without any potential negative effect onto the operation of the engine.

The PC is used to initiate the primary ignition and the SC is used to develop the main combustion in the engine. The PC will contain an amount of the mixture of air and fuel enough to generate pressure when ignited to facilitate compression of the mixture of air and fuel in the SC. This compression should be enough to allow the mixture in the SC to reach auto-ignition point while operating in HCCI mode. The term "auto-ignition" is understood herein to be interchangeable with the term "combustion ignition".

At a minimum, the split in volume between the PC and SC is 50:50. Based on estimates this can be increased to 10:90 and beyond without any potential negative effect on the operation of the engine.

The engine will operate at a typical compression of ratio of 8:1. This can be increased as part of the tuning of the engine to improve efficiency. This ratio is maintained in both the PC and SC during the compression event. Assuming, the volume of the PC is equal to the SC, the pressure developed during initial ignition in the PC is more than sufficient to compress the air and fuel mixture in the SC to achieve HCCI.

A further embodiment of the invention provides a spigot or plurality of spigots which are used in conjunction with the separator. In a piston engine, the spigot or spigots are carried on the crown of the piston.

The purpose of the spigot or spigots is to operate slidably into the port or ports of the separator to manipulate the flow of gases during engine operation.

Another integral aspect of the disclosure is the use of a ported piston with valves. This is necessary to adopt crankcase charging strategy. The piston is used to facilitate the entry of the mixture of air and fuel from the crankcase. This type of combustion chamber charging configuration is integral to the design so as to improve scavenging of exhaust gases.

The present disclosure provides advantages to existing engine designs. The invention delivers a method of ignition control in a HCCI engine.

The division of the combustion chamber into two enclosures unlocks potential efficiency gains for an HCCI engine. The SC contains the main charge and generates most of the power output of the engine. The loss incurred in the operation of the PC is negligible when compared to the overall efficiency gain of the engine. The amount of fuel consumed by the introduction of the PC is very small relative to the total amount of fuel required during each cycle.

Since the engine is more efficient it follows the CO2 emission is less per unit of output power. Correspondingly, due to the lower operating temperature in the SC, the production NOx is reduced by at least 50%. The design of the engine allows for a lean mixture which reduces the amount of soot and hydrocarbon emissions.

Tertiary Combustion

As an unexpected but positive consequence of the presence of flame in the PC, the issue of hydrocarbon emissions in HCCI is mitigated. During the exhaust event, gases from the SC flow into the PC. This allows for any unburned gases in the SC to be exposed to flames in the PC resulting in secondary combustion, which reduces hydrocarbon emissions.

Since the engine is more efficient it follows the CO2 emission is less per unit of output power. Correspondingly, due to the lower operating temperature in the SC, the production NOx is reduced by at least 50%. The design of the engine allows for a lean mixture which reduces the amount of soot and hydrocarbon emissions.

The possibility of engine knock is also reduced eliminated because of the use of lean mixture and lower operating temperature. HCCI operates on lean mixture. When combined with lower temperatures in the combustion chamber, the likelihood of an engine knock occurring is minimised.

Another advantage of this invention is the mechanical gain in piston engines achieved during the main combustion. Since the main combustion event occurs further away from the top dead centre (TDC), the angular position of the piston delivers more torque. When compared to an Otto engine, maximum pressure is delivered at a more desirable crank angle allowing conversion of energy into work with less opposing force.

Arrestors

The separator may further comprise an arresting mechanism, the arresting mechanism configured to decelerate the separator within the combustion chamber. The arresting mechanism may be pressure activated.

The arresting mechanism may comprise an arrestor movably housed within the separator, such that the compression and subsequent combustion of the fuel/air mixture in the secondary chamber forces the arrestor to move relative to the separator and into contact with a wall of the combustion chamber. The movement of the arrestor within the separator may be controlled by pressure variation within the secondary chamber.

The arresting mechanism may be electronically activated. The arresting mechanism may be electro-magnetically activated. The arresting mechanism may comprise an electronic trigger that initiates a restorative magnetic force retarding the motion of the separator toward the piston.

The volume of the secondary chamber may be equal to the volume of the primary chamber when the separator is in equilibrium. The secondary chamber may have a greater volume than that of the primary chamber when the separator is in equilibrium.

The ignition source may be a spark ignition source in the primary chamber. The ignition source may comprise a secondary fuel/air mixture composed to auto-ignite within the primary chamber.

The piston may be operably associated with a crank such that motion of the piston within the combustion chamber drives the crank.

To further maximise the extraction of available energy from the HCCI combustion in the SC, a mechanical arrestor is incorporated into the separator to reduce its velocity after the primary ignition. This arrestor redirects the force developed in the SC towards the crank thereby preventing further movement of the arrestor towards the piston. The net effect is the equivalent of transforming the separator into a stationary boundary that allows the pressure in the SC to completely channel the power torque to the piston and the torque to the engine crank.

In some embodiments, a pressure actuated damper or dampers (mechanical arresters) are incorporated in the reciprocating separator. These dampers may be a similar shape to piston rings but with thicker dimensions. These dampers may be disposed around a peripheral wall of the reciprocating separator and retained by grooves or protrusions thereon. Actuation of the mechanical arrestor is effected through cavities or holes within the separator to allow pressure from the SC to push and engage the dampers with internal walls of the cylinder or parts thereof. The mechanical arrestors are deployed so as to protrude from the separator when activated.

In accordance with a still further aspect of the present invention there is provided a hybrid ignition process for an engine, the process comprising; introducing a fuel/air mixture into the engine's combustion chamber that comprises a primary chamber and a secondary chamber divided by a reciprocating separator; sealing the primary chamber from the secondary chamber; and igniting the fuel/air mixture in the primary chamber thereby driving the separator to compress and spontaneously combust the fuel/air mixture in the secondary chamber to drive a piston.

The introducing of the fuel/air mixture into both the primary and the secondary chambers may be from a single inlet. The fuel/air mixture may flow from the secondary chamber into the primary chamber.

The sealing of the primary chamber may be by moving the piston within the combustion chamber. The sealing the primary chamber from the secondary chamber may be by driving a closer on the piston into engagement with an aperture in the separator to thereby seal the primary chamber from the secondary chamber.

Igniting the fuel/air mixture within the primary chamber may be by introducing heat into the primary chamber. Igniting the fuel/air mixture within the primary chamber may be by introducing a spark into the primary chamber. Igniting the fuel/air mixture within the primary chamber may be by compressing the fuel/air mixture in the primary chamber.

The hybrid ignition process may comprise the step of isolating the fuel/air mixture within the secondary chamber from the spark in the primary chamber. The igniting of the fuel/air mixture within the secondary chamber may be by auto-ignition.

The hybrid ignition process described above may include reducing the volume of the secondary chamber, and thereby increasing the temperature and pressure of the fuel/air mixture in the secondary chamber to spontaneously ignite the fuel/air mixture therein.

In accordance with a still further aspect of the invention provides an engine, comprising: an engine block as described above; and a crank case housing a crankshaft, the crank case in fluid communication with the combustion chamber of the engine block, wherein the piston of the engine block is operably engaged with the crankshaft such that reciprocating motion of the piston within the combustion chamber imparts a rotational velocity to the crankshaft. The fuel/air mixture may be drawn into the inlet through the crank case. 1. The air and fuel may be drawn into the combustion chamber separately. The air may be drawn into the inlet through the crank case. The fuel may be introduced into the combustion chambers by direct injection.

BRIEF DESCRIPTION OF DRAWINGS

Embodiments of the invention are illustrated by way of example, and not by way of limitation, with reference to the accompanying drawings, of which.

DESCRIPTION OF EMBODIMENTS

The invention will now be described more fully hereinafter with reference to the accompanying drawings, in which various embodiments although not the only possible embodiments, of the invention are shown. The invention may be embodied in many different forms and should not be construed as being limited to the embodiments described below.

The invention introduces a simplistic mechanical method of containment of air and fuel in the combustion chamber of an internal combustion engine 1. An advantage of the invention is to reduce frictional and efficiency losses during the operation of an internal combustion engine 1. Using a spigot 17 to seal the exhaust port 22 of a combustions chamber 3, instead of a valve, facilitates this advantage. When compared to utilising valves, the use of a spigot 17 to seal the port 22 achieves similar results with specific advantages. In this manner losses are reduced due to reduced complexity of internal components and reduced friction. It further enhances expulsion of combusted fuel/air mixture from the combustion chamber.

Figure 1:
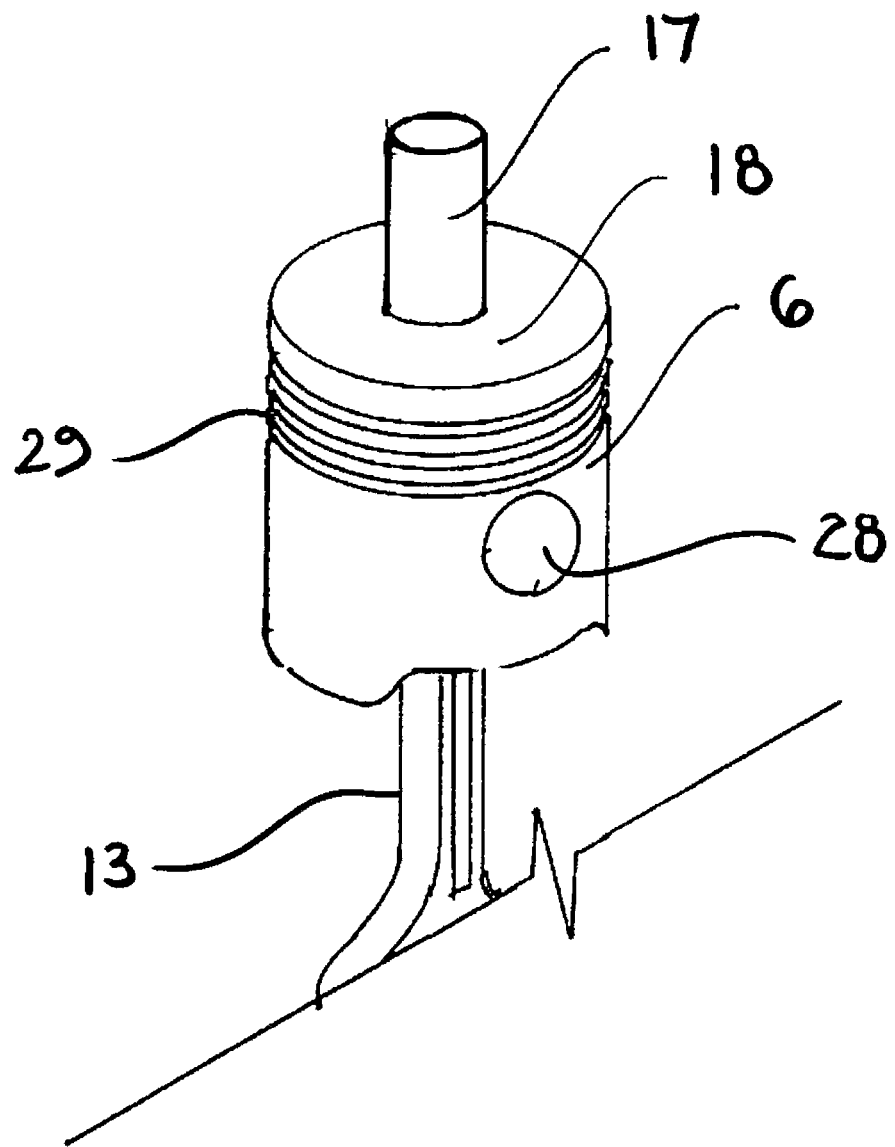
FIG. 1 is perspective view of a piston having a spigot upon the crown of the piston, according to a first embodiment of the invention.
Figure 2:
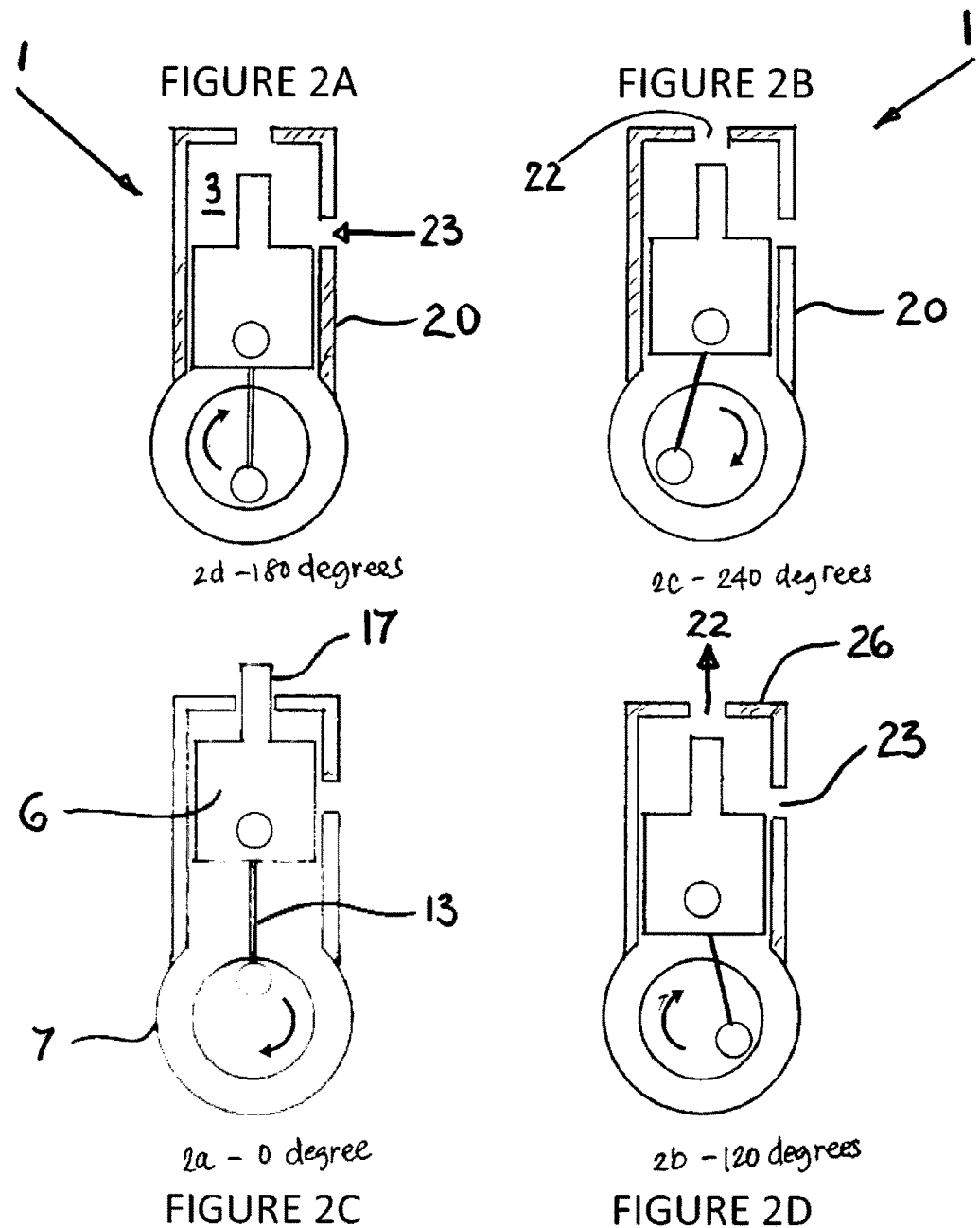
FIGS. 2A-2D are schematic drawings, illustrating the relationship between the piston and attached spigot of FIG. 1 and an exhaust valve of an engine block through four phases of a combustion cycle.

In the illustration of FIG. 1, the spigot 17 is incorporated on the piston 6, both of which are situated inside the combustion chamber, illustrated in FIG. 2 as a cylinder 4. While this model is utilised to demonstrate the use of the spigot 17, its deployment in the cylinder 4 is not limited to being an integral part of the piston 6.

It is contemplated that the spigot 17 can be manufactured independently and later combined with the piston 6. For example, the piston 6 can comprise a threaded hole for receiving and threadingly engaging the spigot 6. Alternatively, the spigot 16 can be integrally formed with the piston 6 and machined to tolerance from the same casting or billet as a crown 18 of the piston 6.

The spigot 17 is supported on a top surface of the piston 6, illustrated in FIG. 1 as the crown 18. The spigot 17 is centrally located on the crown 18 and aligned with the direction of movement of the position 6 within the cylinder 4. The spigot 17 need not be aligned with the centre of the crown 18 to make the invention work, however, further benefits are achieved by a central placement of the spigot 18.

FIG. 1 further illustrates the piston 6 being connected to a connection rod (conrod) 13. The big-end 15 of the conrod 13 is operatively engaged with a crankshaft 12 to rotate the crankshaft 12 within a crankcase 7, thereby transferring the work done by the engine 1 to mechanical drive. The small end 14 of the conrod 13 is operatively engage with the piston 6, to allow the piston to rotate in relation to the conrod 13 as the piston 6 reciprocates within the cylinder 4.

A gudgeon pin (not illustrated) is used to rotatably connect the piston 6 to the conrod 13, access to which is provided by the gudgeon pin aperture 28 in a side wall 38 of the piston 6. The side wall 38 of the piston is further provided with at least one groove 29 that circumvents the piston side wall 38 for seating a sealing member (not illustrated) therein, see FIG. 1.

The spigot 17 of FIG. 1 is in the form of a cylindrical protrusion. The form of the spigot 17 corresponds with the size and shape of the cylinder exhaust port 22. Any form of spigot 17 can be used as long as the spigot 17 and the port 22 are matched in their physical characteristics and are aligned geometrically. This allows the spigot 17 to operate slidably into and out of the port 22. This configuration facilitates the closing of the port 22 when the spigot 17 moves towards the port 22. The spigot 17 and port's 22 dimensions can vary depending on the tuning of the engine 1.

In some embodiments the exhaust port 22 can be tapered, the taper increasing the diameter of the port inwardly of the cylinder 4. This tapering facilitates engagement and alignment of the spigot 17 on coming into engagement with the port 22. In an alternative embodiment, the spigot 17 is tapered to narrow as it extends away from the piston 6. This tapering of the spigot 17 facilitates engagement and alignment of the port 22 with the spigot 22 during operation of the engine 1.

The construction of the plug must be substantial to sustain high reliability. The method of attachment of the spigot 17 to the piston 6 and the type of material of the spigot 17 will be dictated by the stresses introduced by the mechanical movement of the spigot 17 and piston 6. It is possible for the spigot 17 and piston 6 to be machined from the same piece of metal if necessary to deliver the strength required to counter the forces acting against the spigot 17.

Furthermore, the type of material for the manufacture of the spigot 17 and the piston 6 must be capable of sustaining the temperatures, pressures, changes in temperature and chemicals present in the cylinder 4 during the combustion process.

To demonstrate the operation of the spigot 17 and piston 6, in FIGS. 2A-2D, a representative two-stroke engine is used. Other forms of internal engine can be used for an example; however, for simplicity, a two-stroke engine is considered. During a typical two-stroke engine cycle, there are four significant events relevant to the operation of the engine: intake of the fuel/air mixture into the cylinder 4 (FIG. 2A); compression of the air/fuel mixture within the cylinder (FIG. 2B); combustion of the fuel/air mixture (FIG. 2C); and exhausting of the combusted fuel/air mixture (FIG. 2D).

The cylinder 4 has a cylinder head 26 such that a combustion chamber 3 is defined between the cylinder head 26 and the crown 18 of the piston 6. This combustion chamber 3 is constantly changing in volume as the piston 6 reciprocates within the cylinder 4. The change in volume of the combustion chamber 3 is referred to as the "displacement" of the cylinder. Where an engine 1 has multiple cylinders 4 the total displacement of all the cylinders is the "engine displacement".

In FIG. 2A, there is shown an engine block 20 having the cylinder 4 housed therein. The engine block 20 is further connected to a crankcase 7, which houses a crankshaft 12. The crankshaft 12 is rotatably driven within the crankcase 7 by the conrod 13, which is operatively connected to the reciprocating piston 6.

The inlet 23 of the cylinder 4 is open to allow fuel and air to enter the cylinder 4. At the same time, the exhaust port 22 of the cylinder 4 is open to allow combusted fuel/air mixture to exit the cylinder 4. This occurs when the piston 6 is at a crank angle of 180 degrees, also referred to as bottom bead centre (BDC). The air/fuel mixture is held within a combustion chamber 3, which constantly varies in volume. The combustion chamber 3 is a portion of the volume of the cylinder 4 defined between the crown 18 of the piston 6 and the cylinder head 26. As the piston 6 reciprocates towards and away from the cylinder head 26, the volume of the combustion chamber 3 shrinks to compress the fuel/air mixture therein and then expands in preparation for receiving fresh fuel/air mixture to combust for a subsequent cycle.

In FIG. 2B the crankshaft 12 has continued to rotate the conrod 13 and thus move the piston 6 upwards within the cylinder 4, to being closing the inlet 23. This is at a crank angle of approximately 240 degrees. As this occurs the spigot 17 on the crown 18 of the piston 6 is driven toward engagement with the exhaust port 22.

As the piston 6 nears top dead centre (TDC) at or just before 0 degrees, the spigot 17 seals the exhaust port 22 and the fuel/air mixture within the cylinder 4 is then compressed creating a homogenised mixture of fuel/air within the cylinder 4. This mixture then combusts to drive the piston 6 downwards in the cylinder 4, thereby, rotating the crankshaft 12. This combustion can be initiated through introduction of a spark or can be an auto-ignition process, such that the mixture of air and fuel is taken to a temperature and pressure through reduction of the cylinder 4 volume to spontaneously ignite the fuel therein, see FIG. 2C.

In FIG. 2D, at a crank angle of approximately 120 degrees the exhaust event occurs. The spigot 17 is retracted out of the port 22, allowing combusted air/fuel gases to exit the cylinder 4 through the port 22.

The crank angles used in the above example demonstrate the operation of an engine 1 with the spigot 17 implemented. In the actual operation of the engine 1, these crank angles will vary depending on tuning of the engine 1 and the desired results.

In this example, the configuration of the spigot 16 and port 22 allows combustion gases to flow efficiently from the cylinder 4. Having the port 22 situated at the centre of the cylinder head 26, the movement of the piston 6 towards the cylinder head 26 allows the combustion gases to be pushed in same direction i.e. towards the exhaust port 22. This enhances scavenging of gases from the cylinder 4

Figure 3:
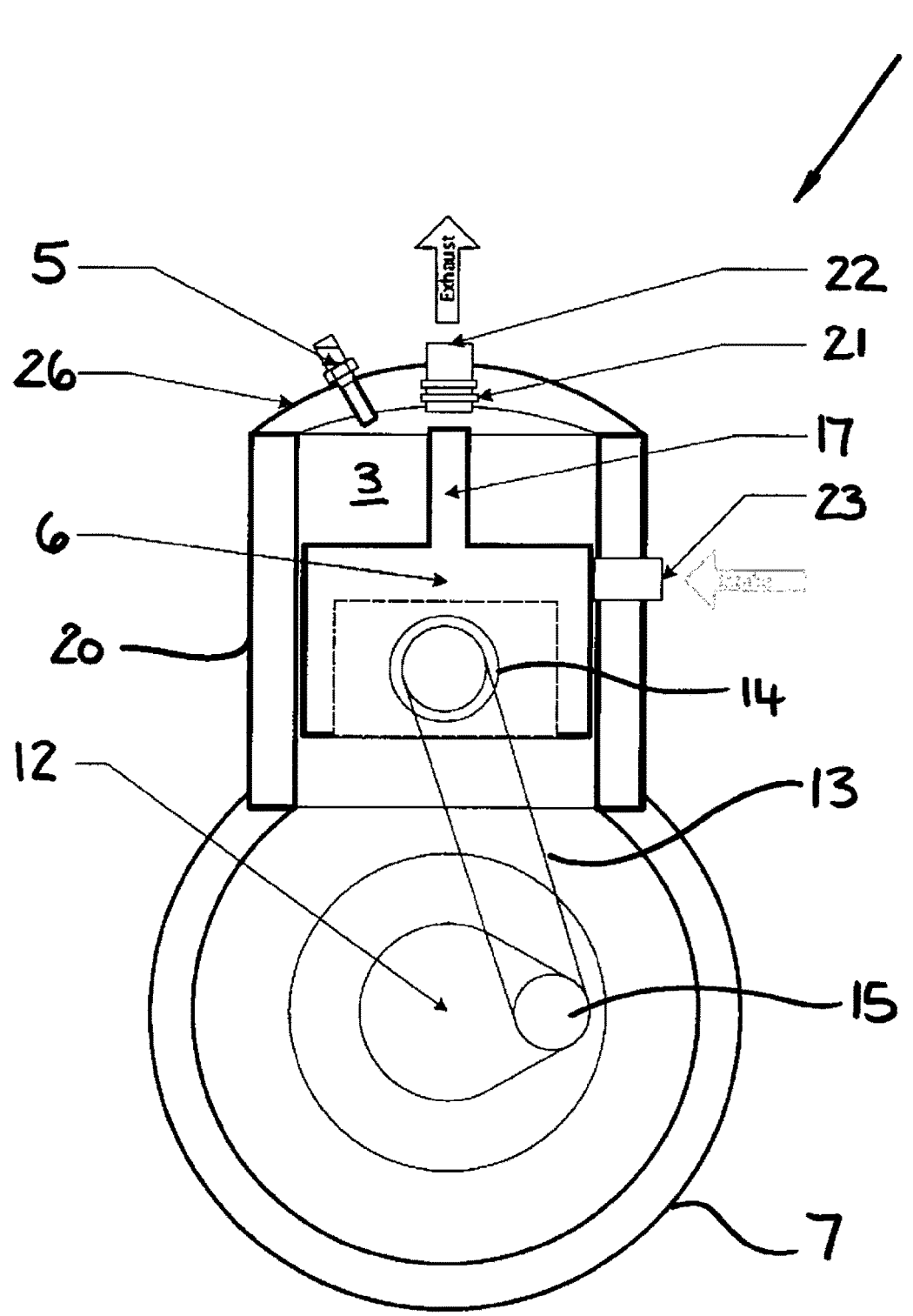
FIG. 3 is a detailed cross-sectional view of a two-stroke engine, illustrating an ignition source within a combustion chamber of the engine.
Figure 4A:
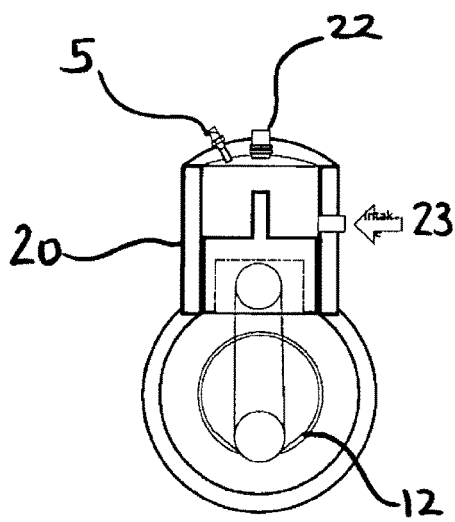
FIGS. 4A to 4D are cross-sectional views of the engine of FIG. 3 illustrating each of the four phases of an engine combustion cycle.
Figure 4B:
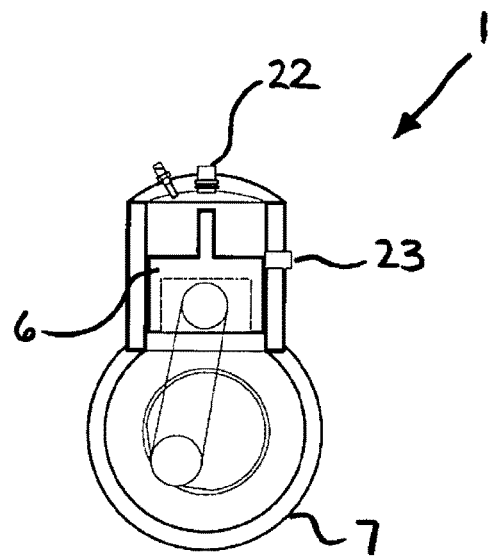
Figure 4C:
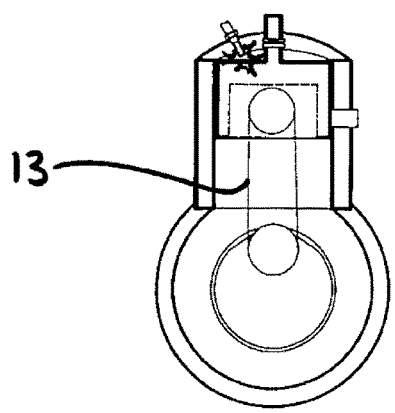
Figure 4D:
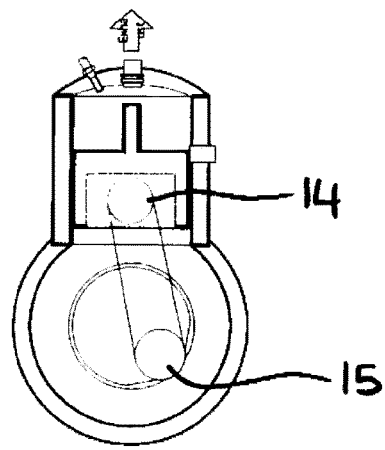

FIG. 3 illustrates an alternative embodiment of the cylinder 4, having a spark plug 5 disposed within the cylinder head 26. The spark plug is within the combustion chamber 3 of the cylinder 4. The exhaust port 22 and the air/fuel inlet 23 must be closed before the spark plug 5 introduces a spark into the compressed air/fuel mixture otherwise the explosion of the fuel combusting will not drive the piston 6 away from the cylinder head 26. The combustion chamber 3 not being fully sealed before ignition results is poor timing of the engine stroke and very inefficient use of the fuel introduced into the combustion chamber 3.

In FIG. 3, the piston 6 is shown to be hollow having a central cavity 25. The cavity 25 houses the connection between the small end 14 of the conrod 13 and the gudgeon pin of the piston 6. Underneath the piston 6, the conrod 13 is connected to the crankshaft 12 within the crankcase 7.

A valve 21 is placed in the cylinder head 26, in alignment with the spigot 17. The valve 21 is sealed by the spigot 17 and extends partially into the cylinder 4 to receive the spigot 17 as the piston approaches top dead centre. The motion of the piston 6 within the cylinder 4 physically blocks the fuel/air inlet 23 sealing the fuel/air mixture within the combustion chamber 3. The valve 21 can be tapered to facilitate alignment and engagement of the spigot 17 when the engine 1 is in use.

FIGS. 4A to 4D illustrate the four stages of the piston stroke: intake, compression, combustion and exhausting as described above, respectively, in relation to FIGS. 2A to 2D. During the intake stage of FIG. 4A both the inlet 23 and outlet 22 are open, as the fuel/air mixture is compressed to the preferred ratio, the spark is introduced, at FIG. 4C, to combust the mixture and drive the piston 6 away from the cylinder head 26. The spark plug 5 is typically fired electronically to ensure that ignition occurs at the optimum timing of the piston 6 stroke.

Dual Chamber Cylinder Engine

In a second aspect of the invention, there is provided an engine block 20 housing a cylinder 4. Within the cylinder there is an inlet 11 and an outlet 22 for allowing fuel air/mixture to enter and exit the cylinder. The cylinder further comprises a piston, 6 which is configured to reciprocate back and forth within the cylinder 4. The piston supports a spigot 17 mounted to a crown of the piston 18. The piston 6 is constrained by the cylinder 4 to reciprocate in a linear motion such that a conrod 13 attached to the piston 6 is driven. The motion of the conrod 13 is converted into rotational drive through a crankshaft 12 housed within a crankcase 7 of the engine 1. The reciprocating motion of the piston 6 further drives the spigot 17 to reciprocate within the cylinder 4.

A combustion chamber 3 is created within the cylinder between the crown 18 of the piston 6 and the cylinder head 26. The combustion chamber further comprises a reciprocating separator, illustrated in FIG. 5 as an auxiliary piston 16. The addition of the auxiliary piston 16 divides the combustion chamber 3 into a primary chamber 3a and a secondary chamber 3b.

In dividing the combustion chamber 3, the engine 1 operates as an internal combustion engine providing a combination of sparked ignition (SI) and Homogeneous Charge Compression Ignition (HCCI). The primary chamber 3a operates in SI mode and the secondary chamber operates in HCCI mode.

The engine 1 may be implemented as a piston engine. In the piston engine, the pressure developed from the secondary chamber 3b is converted into useable work when the piston 6 is pushed, actuating the conrod 13 and resulting in a rotational movement of the crankshaft 12.

Figure 5:
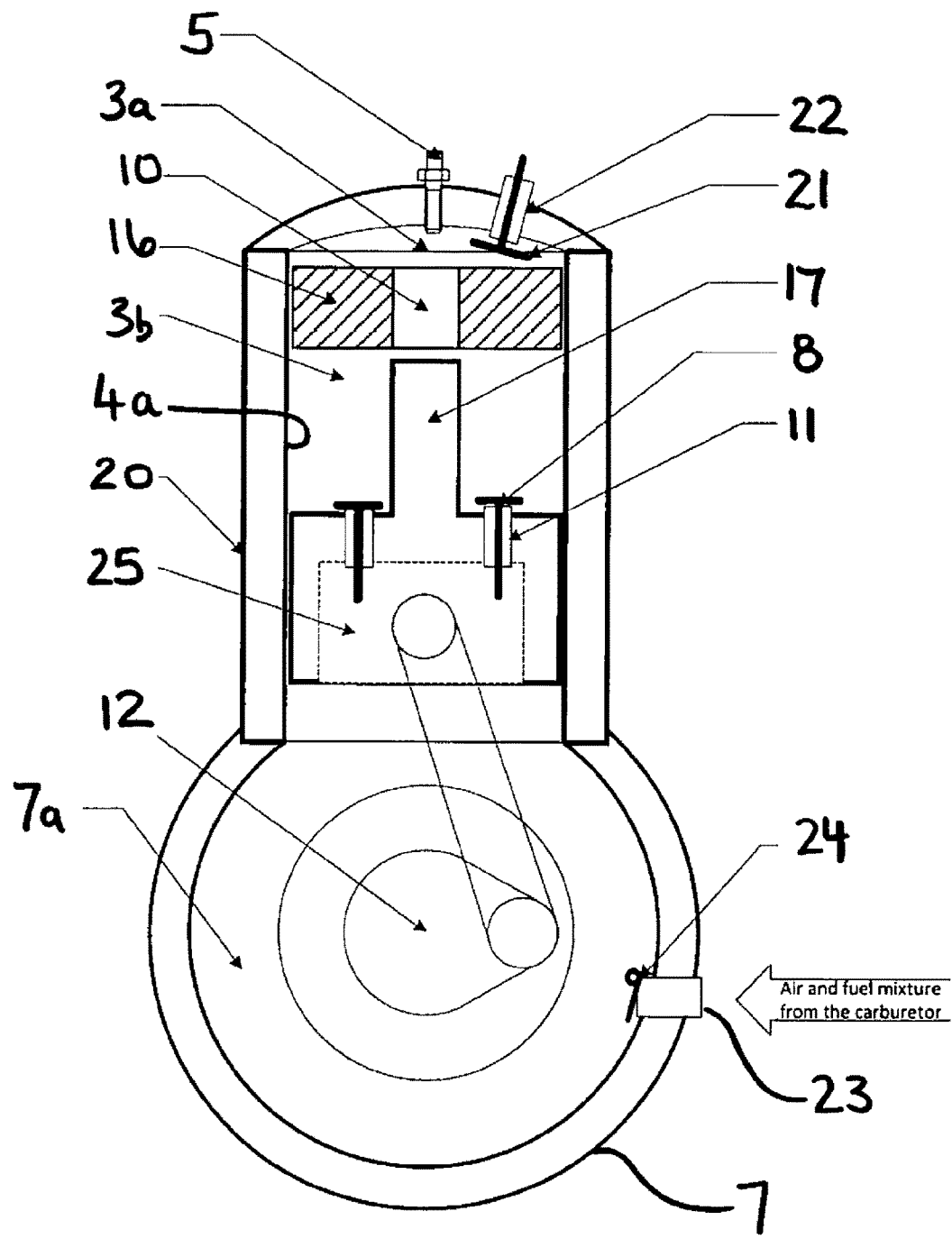
FIG. 5 is a cross-sectional view of a two-stroke engine in accordance with a second aspect of the invention, illustrating the inside of a cylinder of the engine.

A representative two-stroke single piston engine, as in FIG. 5, is used to facilitate the description of this aspect of the invention. In this case the spigot 17 is incorporated on the crown 18 of the piston 6.

FIG. 5 illustrates the auxiliary piston 16 in an equilibrium or rest position. The equilibrium position is defined as a position in which the auxiliary piston 16 is not under compressive loading from either of the pressure in the primary chamber 3a or the pressure in the secondary chamber 3b. The equilibrium position also represents the minimum volume of the primary chamber 3a and the maximum volume of the secondary chamber 3b. The engine 1 can be tuned for different volumetric ratios between the primary chamber 3a and the secondary chamber 3b. In some embodiments, the primary chamber 3a and the secondary chamber 3b can be substantially the same volume, such that the equilibrium position of the auxiliary piston 16 bisects the combustion chamber 3 substantially in half. In another embodiment, as illustrated in FIG. 5, the auxiliary piston 6 in equilibrium bisects the combustion chamber 3 such that the primary chamber 3a is of lesser volume than the secondary chamber 3b. The bisection of the combustion chamber 3 influences the amount of fuel/air mixture to be compressed and combusted in each of the primary chamber 3a and the secondary chamber 3b.

As illustrated in FIG. 5, the auxiliary piston 16 is illustrated as a mechanical component that provides a physical method of dividing the combustion chamber into two distinct enclosures. Its function is to isolate the primary chamber 3a from the secondary chamber 3b, and vice versa. This provides a boundary between the SI and the HCCI methods of combustion within the combustion chamber 3.

The primary chamber is located between the cylinder head 26 and a top surface 16a of the auxiliary piston 16. The secondary chamber 3b is located between a bottom surface 16b of the auxiliary piston 16 and the crown 18 of the piston 6.

The auxiliary piston 16 illustrated in FIG. 5 is annular and provides a central aperture 10 therethrough. The central aperture 10 is aligned with the spigot 17 of the piston 6, such that the auxiliary piston can reciprocate along the spigot 17 within the cylinder 4 independently of the reciprocating motion of the piston 6. The central aperture 10 thus provides an outlet to the secondary chamber 3b and an inlet to the primary chamber 3a.

The auxiliary piston 16 is capable of operating slidably along the longitudinal axis of cylinder 4, similar to the movement of the piston 6. The construction and dimensions of the auxiliary piston 16 prevent it from twisting away or being dislodged from its intended axis. The auxiliary piston 16 can provide a plurality of apertures 10 designed to function as passageways to control the flow of gases between the primary 3a and secondary 3b chambers.

The primary chamber 3a is used to create a charge when the mixture of air and fuel is ignited by the spark plug 5. The dimension of this enclosure is dictated by the amount of mixture necessary to facilitate the build-up of pressure required to compress the fuel/air mixture in the secondary chamber 3b. The exact dimensions will vary depending on the tuning of the engine. In terms of proportion, the dimension of the primary chamber 3a will not exceed 50% of the total volume of the entire cylinder 4. The primary chamber 3a is closest to the exhaust port 22 of the combustion chamber 3.

The secondary chamber 3b is used to contain the main charge of the engine 1. Air/fuel mixture enters the combustion chamber 3 and pervades both the primary chamber 3a and the secondary chamber 3b. As the piston 6 moves towards the cylinder head 16, the spigot 17 is driven through the central aperture 10 of the auxiliary piston 18 thereby sealing the primary chamber 3a from the secondary chamber 3b. At this time, both chambers contain a combustible fuel/air mixture. The sparkplug 5 is located in the cylinder head 26 and once the combustion chamber 3 is divided, the spark plug 5 is no longer in fluid communication with the air/fuel mixture within the secondary chamber 3b.

The spark plug 5 ignites the compressed fuel/air mixture within the primary chamber 3a. This rapid expansion as the fuel/air mixture combusts drives the auxiliary piston 18 towards the piston 6. The movement of the auxiliary piston 16 compresses the mixture of air and fuel in the secondary chamber 3b, by compressing the secondary chamber 3b. This movement of the auxiliary piston 18 results in the auto-ignition of the fuel/air mixture in the secondary chamber 3b, as a result of the reduction in volume in the secondary chamber 3b when the gas in the primary chamber 3a combust and expands.

The increase in pressure in the secondary chamber 3b triggers auto-ignition of the gas thereby operating the piston in HCCI mode. The power generated in the secondary chamber 3b is where the majority of the power for the engine 1 is developed.

The dimensions of the secondary chamber 3b will vary depending on the tuning of the engine. The volume of the secondary chamber 3b can be more than 50% of the total volume of the cylinder 4.

A series of valves 8 are disposed within corresponding ports 11 within the crown 18 of the piston 6. These valves 8 are used to open and shut the ports 11 in the piston 6. These valves 8 control the ingress of fresh fuel/air mixture in the combustion chamber 3 for driving the engine 1. In the embodiment illustrated in FIG. 5, the fuel/air mixture is brought into the combustion chamber 3 through the piston 6. The fuel/air mixture enters the engine 1 through a reed valve 24 located on the crankcase 7. In this manner the fuel/air mixture is scavenged through the crankcase 7 to feed the combustion chamber 3.

The valves 8 dimensions are identical to the dimensions of the ports 11 in the piston 6 to facilitate sealing of the ports 11 during engine operation. Their function is to prevent gases from flowing between the enclosures during specific periods of the engine cycle.

The valves 8 are configures to have large flat surfaces within the combustion chamber, such that pressure increase in the combustion chamber 3, essentially secondary chamber 3b, will drive the valves 8 into a sealed position, closing the ports 11 and preventing the ingress of fuel/air into the combustion chamber 3. In reverse, the motion of the piston 6, when driven away from the auxiliary piston 16, allows a pressure differential that forces the valves 8 open. Essentially, the pressure within the crankcase 7 becomes greater than the pressure within the secondary chamber 3b, forcing the valves 8 open ready to allow fresh fuel/air mixture into the combustion chamber 3.

Figure 6:
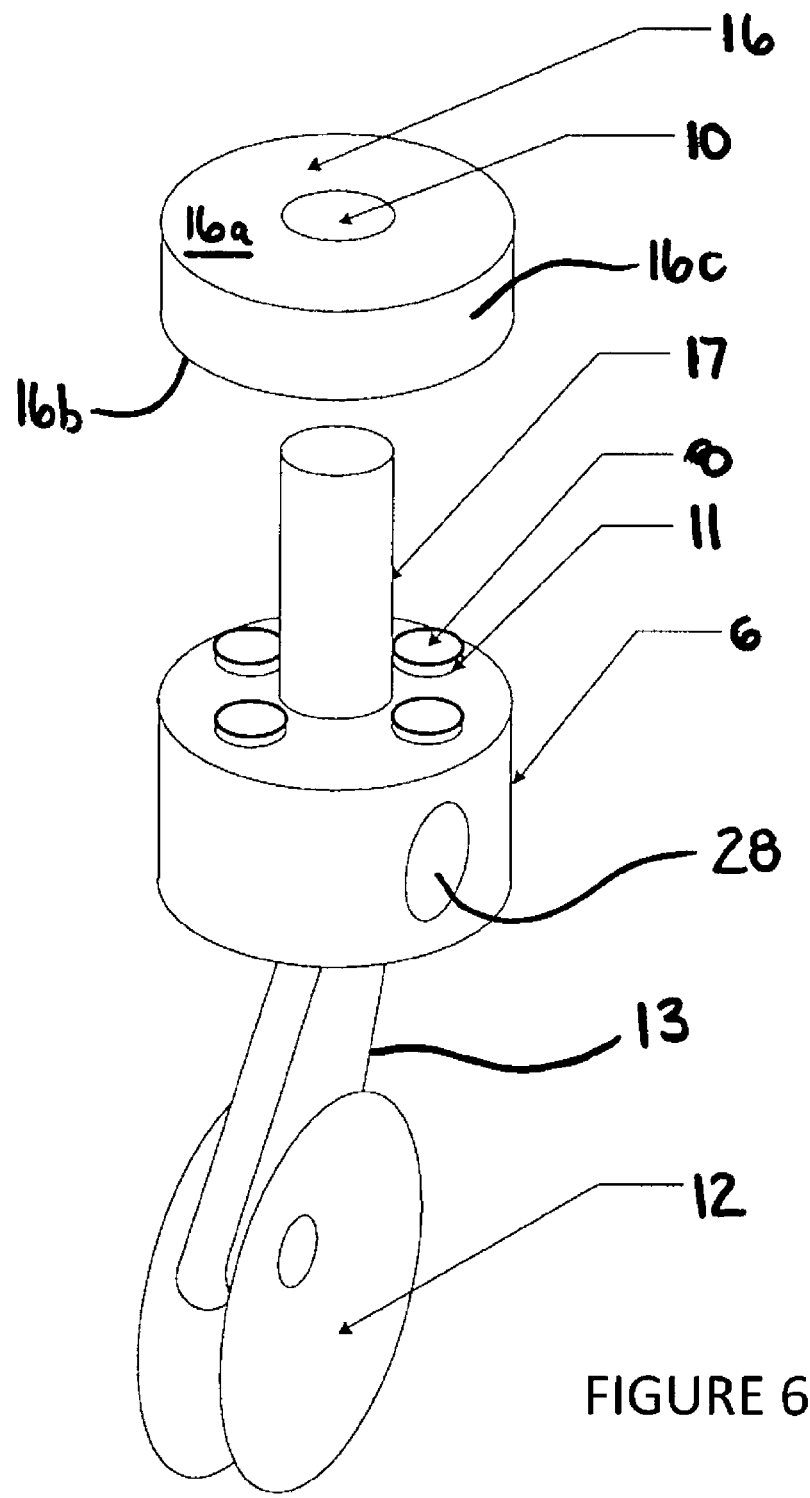
FIG. 6 is an isometric view of internal components from the cylinder of FIG. 5, illustrating an auxiliary piston.

The piston 6 having valves 8 and port 11 is referred to as a ported piston 6, illustrated in FIG. 6. The ported piston 6 facilitates crankcase 7 charging ie delivering fuel and air to the combustion chamber 3 via the crankcase 7. A port 6c or a number of ports are introduced as part of the piston 6 assembly. This configuration of a ported piston 6 allows for a more laminar flow of fuel/air into the combustion chamber 3 to achieve effective gas scavenging from both chambers 3a and 3b.

A similar series of valves and ports can be disposed within the auxiliary piston 16 to facilitate greater fuel/air mixture flow between the primary 3a and secondary 3b chambers. The valves of the auxiliary piston 16 are initiated when there is a difference in pressure between the primary chamber 3a and the secondary chamber 3b. This embodiment is not illustrated.

HCCI can also be used in the primary chamber 3a to start the ignition process. In a further embodiment of the engine 1, the sparkplug 5 within the primary chamber can be replaced with a fuel injector (not illustrated). In this manner a secondary fuel/air mixture can be introduced into the primary chamber 3a.

The fuel injector can be used to introduce fuel/air mixture into the primary chamber 3a alone, or to introduce fuel/air mixture into both the primary 3a and the secondary chamber 3b.

Providing two fuel/air inlets allows a different ratio of fuel/air mixture to be combusted in each of the primary 3a and secondary 3b chambers. Although this adds some complexity to the engine 1 it provides an alternative means of hybrid combustion.

The introduction of a spark to the primary chamber 3a, as described herein, provides control of the primary ignition event, which in turn initiates auto-ignition within the secondary chamber 3b. By removing the spark, and reverting to auto-ignition in the primary chamber, the control exercised over the ignition can be reduced. However, by providing a secondary fuel/air mixture that is tailored for a lower auto-ignition temperature, the ignition of the fuel/air mixture within the primary chamber can be controlled or tuned.

A lower auto-ignition temperature can be achieved by altering the composition of the air/fuel mixture introduced in the primary chamber 3a. The same effect can be achieved by mixing air with a fuel having a lower ignition temperature. Alternatively a fuel alone can be added through the injector, thus mixing a low ignition temperature fuel with the fuel/air mixture already present within the primary chamber 3a, reducing the auto-ignition temperature of the overall mixture. While auto-ignition requires more tuning, as a more complex solution, it is still a viable alternative and will provide the same result as a spark ignition when used as described herein.

Further control means can be incorporated into the primary chamber 3a, such as a heat source or heat plug (not illustrated). The heat plug is used to control the temperature and within the primary chamber 3a and thus further tune the auto-ignition point. The incorporation of auto-ignition with the primary chamber 3a does not adversely affect the auto-ignition within the secondary chamber 3b.

To avoid mixing of the primary and secondary fuel/air mixtures, introduction of any fuel/air mixture into the combustion chamber 3 can only begin after the spigot 17 is driven through the auxiliary piston 18 to thereby seal the central aperture 10 and separate the primary 3a and secondary chambers 3b from one another.

Arrestor Variants

Figure 7:
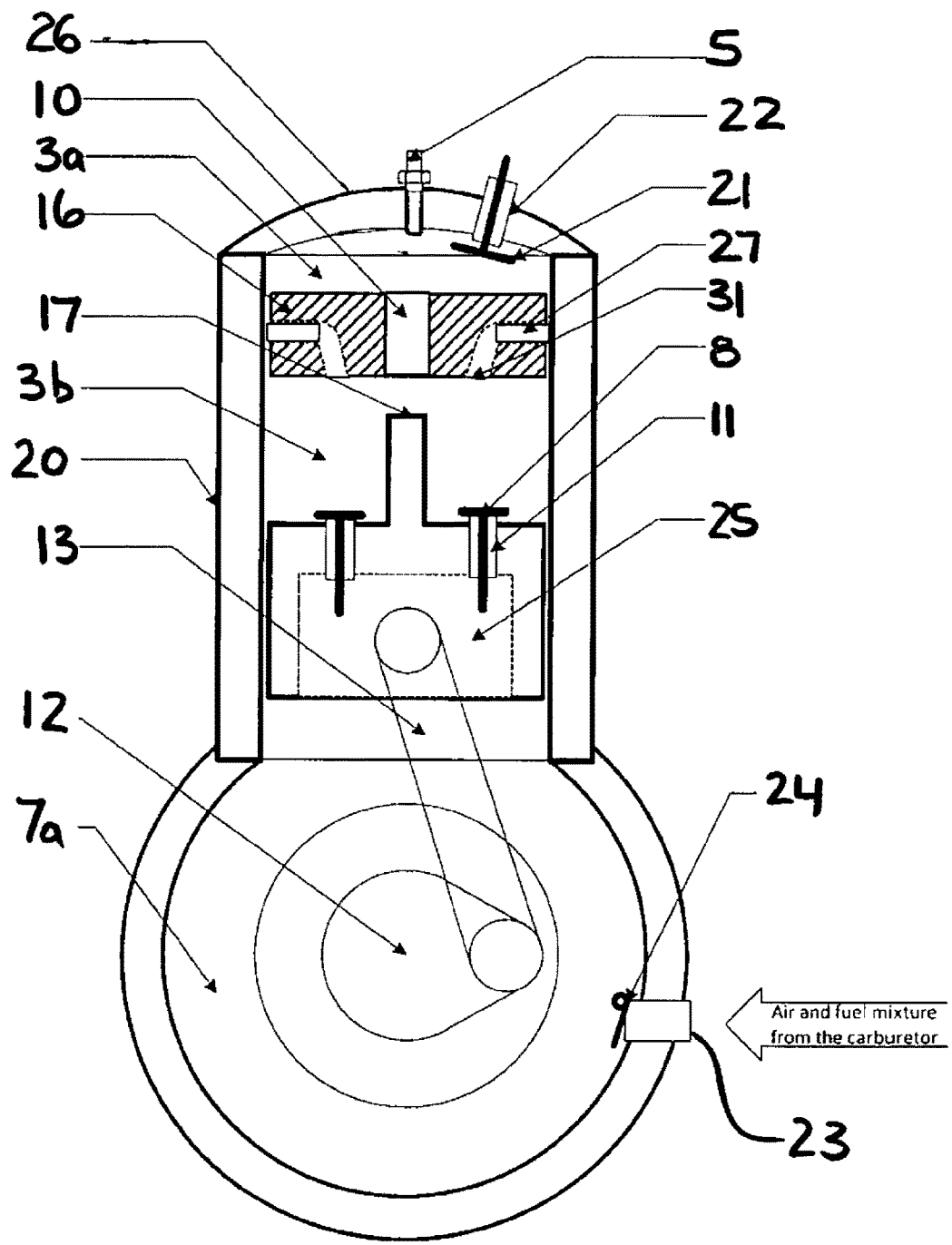
FIG. 7 is a cross-sectional view of the auxiliary piston having an internal braking system.
Figure 8:
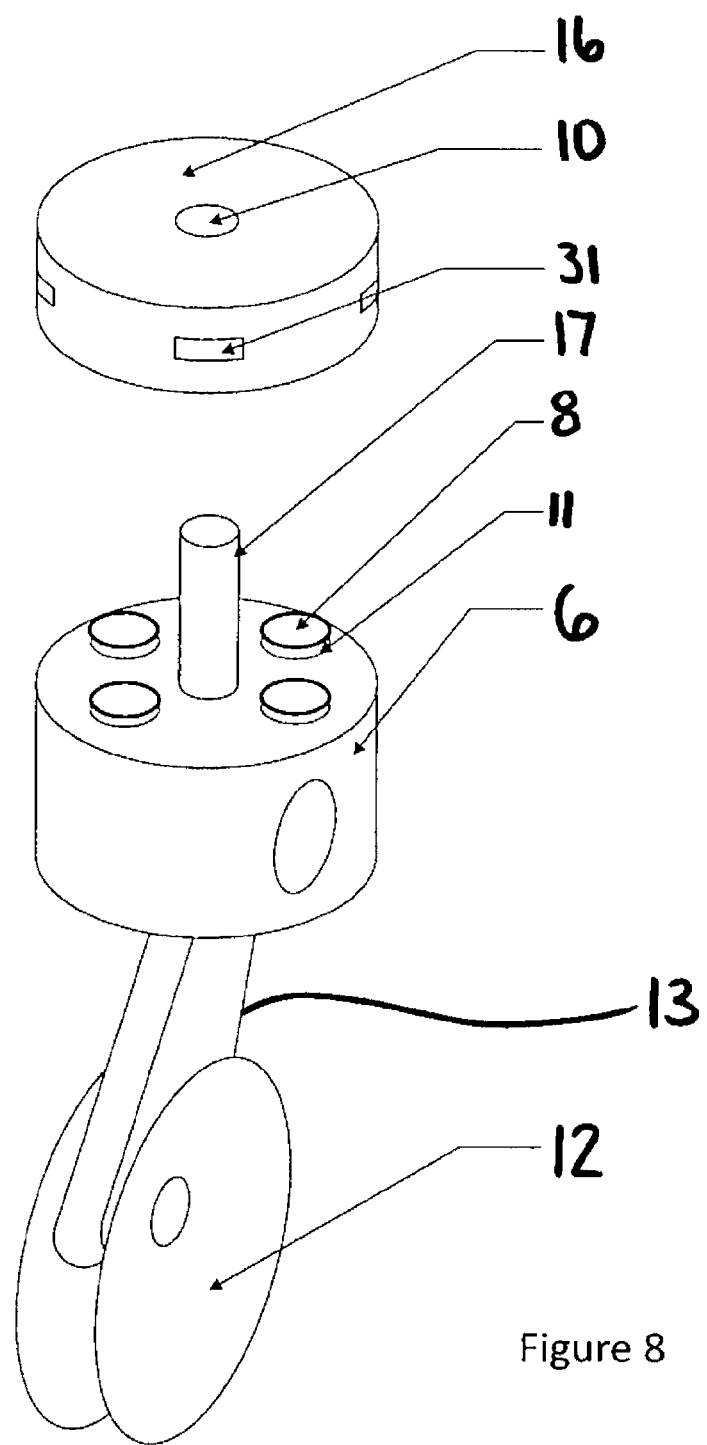
FIG. 8 is an isometric view of the piston and auxiliary piston assembly from FIG. 7.
Figure 9:
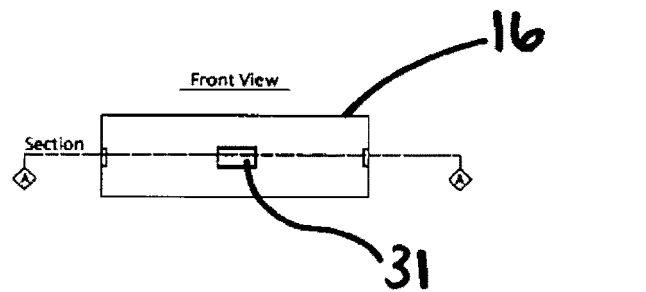
FIG. 9 is a side view of the auxiliary piston, illustrating cavities for housing components of the braking system.
Figure 10:
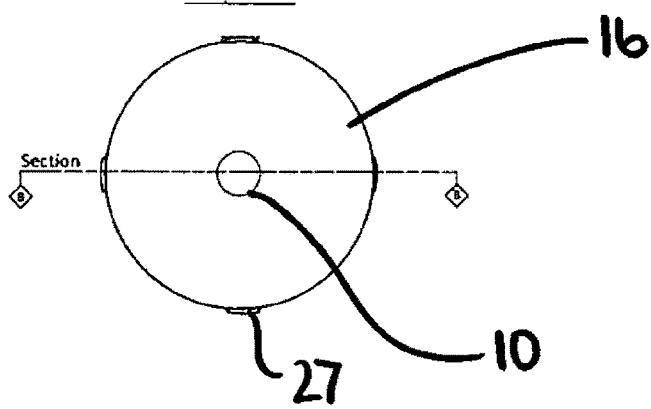
FIG. 10 is a top view of the auxiliary piston, illustrating movable elements of the braking system protruding from the body of the auxiliary piston.
Figure 9A:
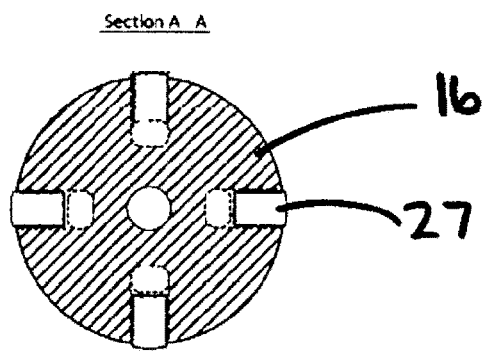
FIG. 9A is a cross section along line AA of FIG. 9.

Velocity brakes/arresters can be used to decelerate the auxiliary piston 16 immediately after the combustion in the secondary chamber 3b. Illustrated in FIG. 7 and FIG. 8, are a plurality of arrestors, configured as moveable blades 27 incorporated in the auxiliary piston 16. Detailed views of the auxiliary piston 16 and the arrestors 27 are illustrated in FIGS. 9 to 10.

Figure 10A:
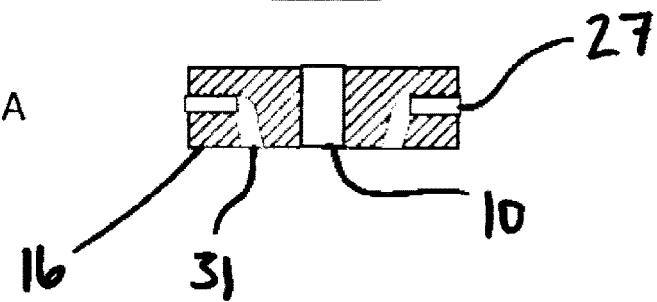
FIG. 10A is a cross section along line BB of FIG. 10.

The blades 27 are housed within a series of cavities 31 which extend from the bottom face 16b of the auxiliary piston 16 to a sidewall 16c of the auxiliary piston 16, illustrated in FIG. 10a.

The blades 27 are actuated when pressure developed during the secondary combustion is forced from the secondary chamber 3b into the cavities 31 in the auxiliary piston 16. This in turn, pushes the blades 27 outwards and into contact with an internal wall 4a of the cylinder 4 (see FIG. 10).

The mechanical contact between the blades 27 and the cylinder wall 4a results in a friction braking effect, retarding the movement of the auxiliary piston 16. This will bring the auxiliary piston 16 to a halt thus directing the pressure developed within the secondary chamber 3b towards the piston 6. The result of this action is the increase of torque transferred to the crankshaft and thus a greater output from the engine 1.

Alternative Arrestors

Others methods of implementing arresters are contemplated through the use of solenoids 33 and magnets 36.

Figure 11:
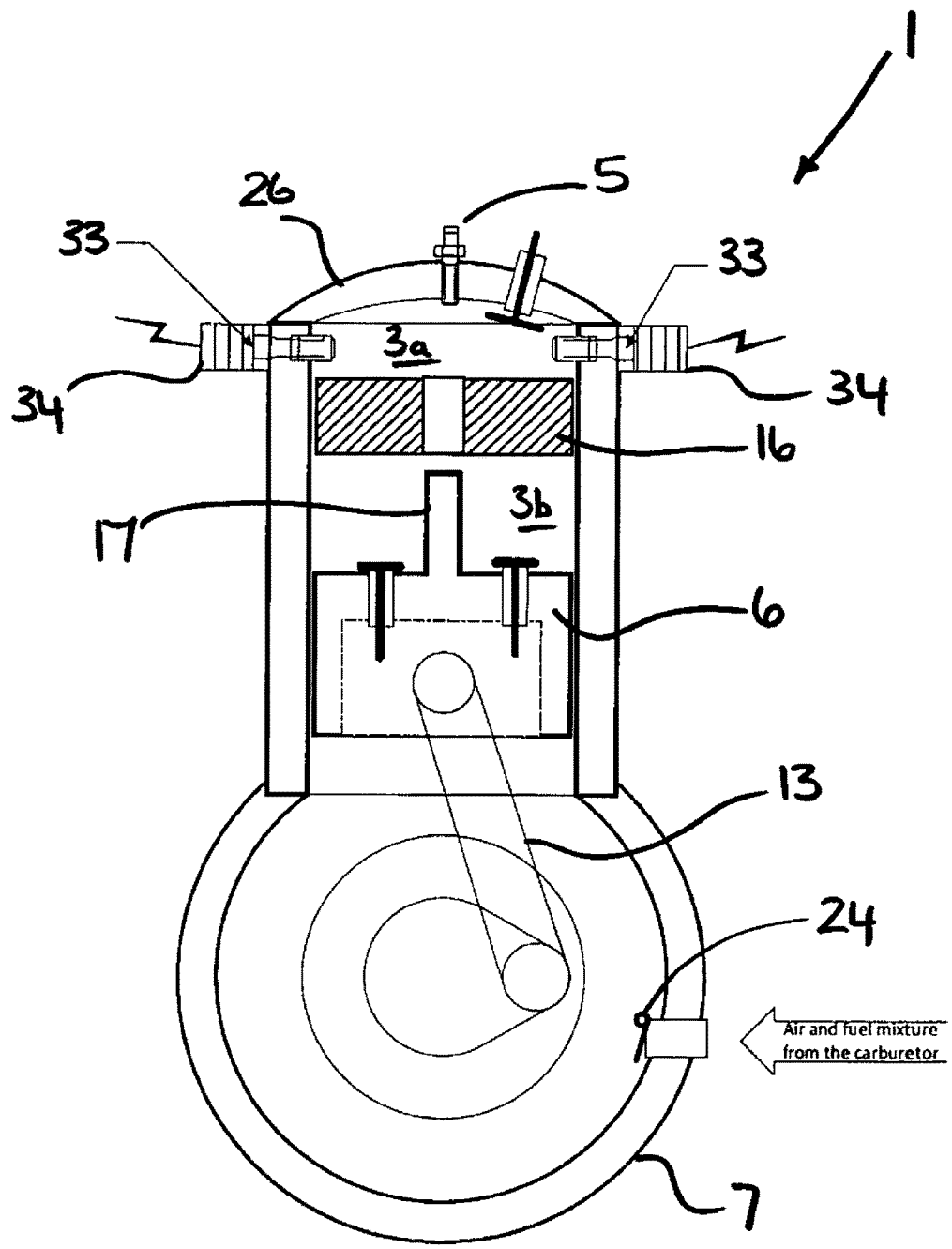
FIG. 11 is a cross-sectional view of the auxiliary piston having an electrically controlled braking system.

Solenoids 33 can be located in the cylinder wall 4a and are activated electrically at a prescribed point in the engine cycle (see FIG. 11). The solenoids 33 are electrically triggered by a trigger mechanism 34 disposed on the outside of the engine 1. The solenoids 33 are deployed in the cylinder wall 4a of the combustion chamber 3. The trigger mechanism 34 is configured to initiate at a predetermined time. When engaged, the solenoid 33 or solenoids will lock the auxiliary piston 16 at a predetermined position in the cylinder 4, preventing further movement.

Figure 12:
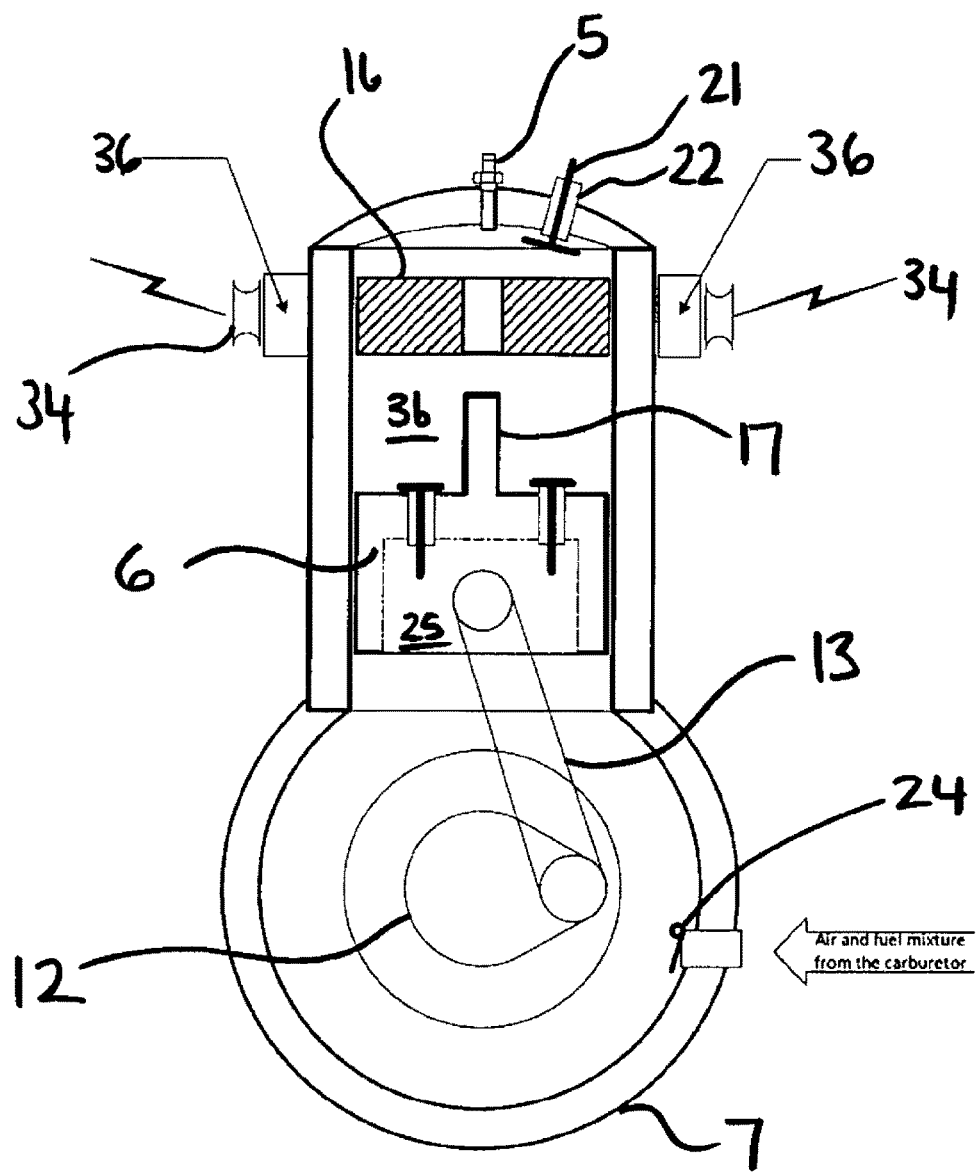
FIG. 12 is a cross-sectional view of the auxiliary piston having an electro-magnetic controlled braking system.

Similarly magnets can be used to slow down the movement of the auxiliary piston 16 when electrically charged. This embodiment is illustrated in FIG. 12, having a pair or magnets 36 circumferentially disposed around the cylinder 4 and an electrical trigger mechanism 34 to actuate the electron-mechanical arrestors. The magnets 36 can also comprise a single annular magnet 36 disposed around the periphery of the cylinder 4. The auxiliary piston 16 can be manufactured from iron or other magnetic material.

Operation of Engine for Hybrid Combustion

The above disclosure to the engine cylinder with a dual chambered combustion chamber is now described with respect to a process for hybrid combustion. The two-stroke engine 1 is used as an example of this process, having a single piston 6 engine is employed wherein an auxiliary piston 16 has a pair of ports 11 valves 8 to seal the ports 11. To facilitate the introduction of air and fuel mixture into the combustion chamber 3 crankcase charging is used through crankcase 7.

The current disclosure is not limited in application to a two-stroke engine. The concept will equally apply to any internal combustion engine cycle regardless of the type of fuel used, diesel, petrol or alternative fuels. The process uses an auxiliary piston 16 to separate a primary chamber 3a and a secondary chamber 3b, where combustion is initiated in the primary chamber 3a, which in turn, initiates combustion in the secondary chamber 3b.

The method of fuel delivery is not restricted to crankcase charging and can be achieved by carburetion, fuel injection or other processes. For the purpose of explaining the process, gasoline is the fuel used.

The start of the process occurs when the combustion chamber 3, (both primary chamber 3a and secondary chamber 3b) is charged using crankcase 7 charging method. This is the intake event, which is accomplished when the mixture of air and fuel supplied by a carburetor (not shown) is introduced into the combustion chamber 3 via the cavity within the crankcase 7. At approximately 180 degrees crank 9 angle, which is the bottom dead centre (BDC), air and fuel is introduced to the combustion chamber 3. This is facilitated when the exhaust valve 21 of the combustion chamber 3 and inlets 11 on the piston 6 are in their open state and the reed valve 24 in the crankcase 7 is in closed state.

The difference in pressure between the crankcase 7 and the combustion chamber 3 allows the mixture of air and fuel to enter the chamber 3. At this stage the pressure in the combustion chamber 3 is lower than the pressure in the crankcase 7. This is possible because the pressure of air/fuel in the crankcase 7 is higher than the pressure in the combustion chamber 3 as a result of the movement of the piston 6 compressing the gas in the crankcase 7. The flow of the air/fuel mixture will push the auxiliary piston 16 toward the cylinder head 26 thereby expanding the volume in the secondary chamber 3b and disengaging the valve 8 in the piston 6 and further disengaging the spigot 17 from the aperture 10 of the auxiliary piston 16. This allows both enclosures—primary chamber 3a and secondary chamber 3b to be charged.

The next phase of the cycle is the compression event. A few crank 9 angle degrees after BDC; the exhaust aperture 10 in the auxiliary piston 16 is closed as the spigot 17 engages the aperture 10. As the piston 6 gradually moves away from BDC, the pressure build up in the primary and secondary chambers 3a, 3b will push the valve 8 on the piston 6 sealing the port 11. The mixtures of air and fuel inside the primary chamber 3a and in the secondary chamber 3b are then compressed as a result.

At this stage, the exhaust aperture 10 of the auxiliary piston 16 is sealed, and the ports 11 on the piston 6 are sealed while the reed valve 8 in the crankcase remains open. Fresh air and fuel mixture is introduced in the crankcase 7 as a result of the difference in pressure between an external environment and the crankcase 7.

A few crank angle degrees before top dead centre (TDC) position, when the exhaust aperture 10 in the auxiliary piston 16 and exhaust port 22 are sealed isolating the primary chamber 3a, a spark 5 is introduced to ignite the air and fuel mixture in the primary chamber 3a. This is the primary ignition event. At this stage the spigot 17 is already engaged in the exhaust aperture 10 of the auxiliary piston 16 forming a seal between the primary 3a and secondary 3b chambers. The combustion takes place in the primary chamber 3a and produces pressure to push the auxiliary piston 16 towards the piston 6 thereby reducing the volume of the secondary chamber 3b.

The movement of the auxiliary piston 16 compresses the air and fuel mixture in the secondary chamber 3b until it reaches auto-ignition. This is the power event. During this phase, temperature and pressure in the secondary chamber 3b will reach a maximum level when the fuel/air mixture spontaneously and completely combusts. During this phase, the piston 6 may have moved a number of crank angle degrees from TDC.

The thermo-chemical reaction in the secondary chamber 3b will deliver the necessary energy to develop pressure in the piston 6 delivering the power of the engine 1. The exhaust port 22, the exhaust aperture 10 on the auxiliary piston 16 and the ports 11 on the piston 6 are all closed during this event.

A few degrees before BDC, the exhaust port 22 is opened. This is the exhaust event. In this phase, combusted fuel/air mixture escape from the secondary chamber 3b into the primary chamber 3a when the auxiliary piston 16 is pushed away from secondary chamber 3b disengaging the spigot 17 from the exhaust outlet 10 of the auxiliary piston 16.

Exhaust gases will further be scavenged by the difference in pressure between the crankcase 7 and combustion chamber 3.

The entrance of fresh fuel/air mixture assists in pushing the exhaust gases out of the combustion chamber 3. Furthermore, it is possible in this phase, that any residual unburned fuel from the HCCI process in the secondary chamber 3b will combust as it enters the primary chamber 3a. This is possible because flame is present in the primary chamber 3a as a product of the spark ignition. This is a positive side effect which is desirable as it will reduce overall levels of hydrocarbon emission. At this stage, the exhaust port 22, the exhaust aperture 10 on the auxiliary piston 16 and the port 11 on the piston 6 are open while the reed valve 24 in the crankcase 7 is closed.

The timing of each event in the aforementioned cycle can be adjusted, as they form part of the tuning of the engine 1. These timings can be adjusted to achieve optimum efficiency by experimentation according to the physical dimensions and capacity of the engine 1.

Figure 14:
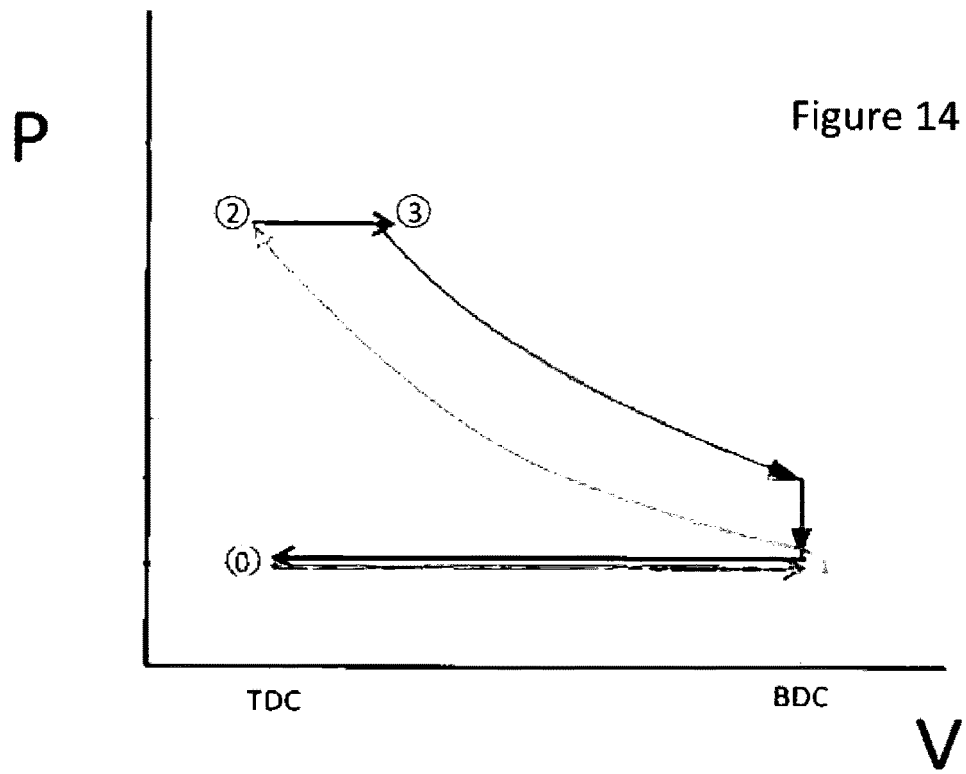
FIG. 14 is a pressure-volume diagram, illustrating the work done by a typical diesel engine.
Figure 15:
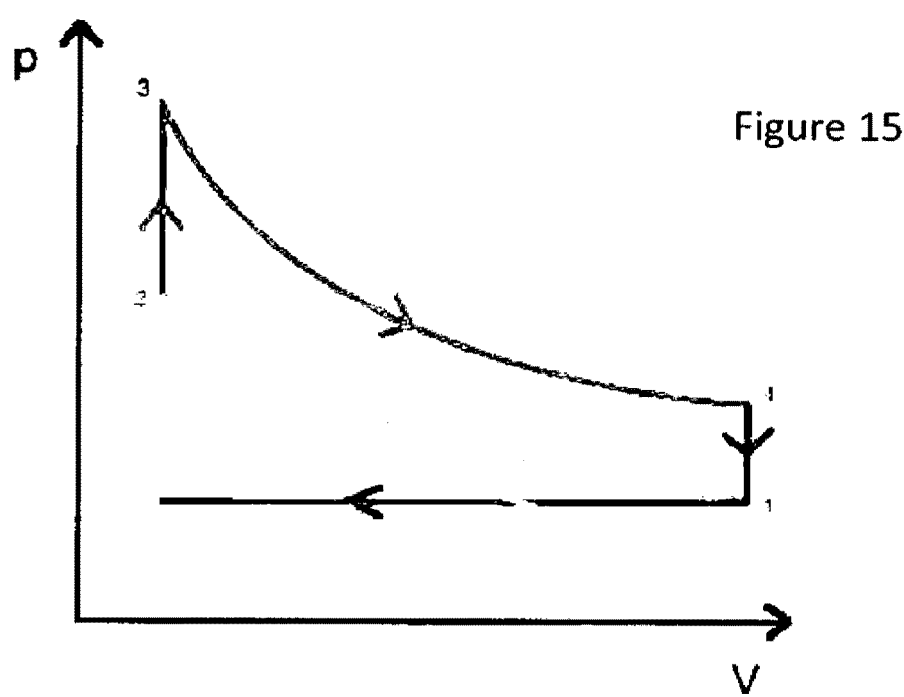
FIG. 15 is a pressure-volume diagram, illustrating the work done by a typical petrol engine.

A thermodynamic cycle for a typical diesel engine and petrol engine are illustrated respectively in FIGS. 14 and 15. The thermodynamic cycle of the present invention is to be contrasted with those of typical petrol and diesel engines.

The thermodynamic cycle of the present process is described in accordance with FIG. 13, as follows:

Process 1-2—Compression

This phase facilitates an adiabatic (isentropic process wherein) compression of the air and fuel mixture is compressed as the piston moves from bottom dead centre (BDC) to top dead centre (TDC). Accordingly, work is done on the gas.

Process 2-3—Controlled Ignition

This phase is carried out as a polytropic process wherein heat is added to the system and transferred to the working gas in the primary chamber. This process is intended to represent the ignition of the air and fuel mixture and the subsequent rapid burning in the primary chamber 3a.

Process 3-4—Auto-Ignition

This phase is a constant volume (isochoric) heat addition occurs as a result of HCCI in the secondary combustion chamber 3b. The addition of heat causes the air and fuel mixture within the secondary chamber 3b to spontaneously combust.

Process 4-5—Power Stroke

This phase produced the engine power. It is an isentropic process wherein adiabatic gas expands as a result of the pressure developed in the secondary chamber 3b from process 3-4.

Process 5-1—Cooling and Exhaust

This phase completes the cycle by a constant-volume process in which heat is rejected from the chamber (isochoric cooling) while the piston is at bottom dead centre. Gas exchange in the chamber also occurs in this phase.

Comparison of the Present Invention with Reference to an Otto Engine

Figure 13:
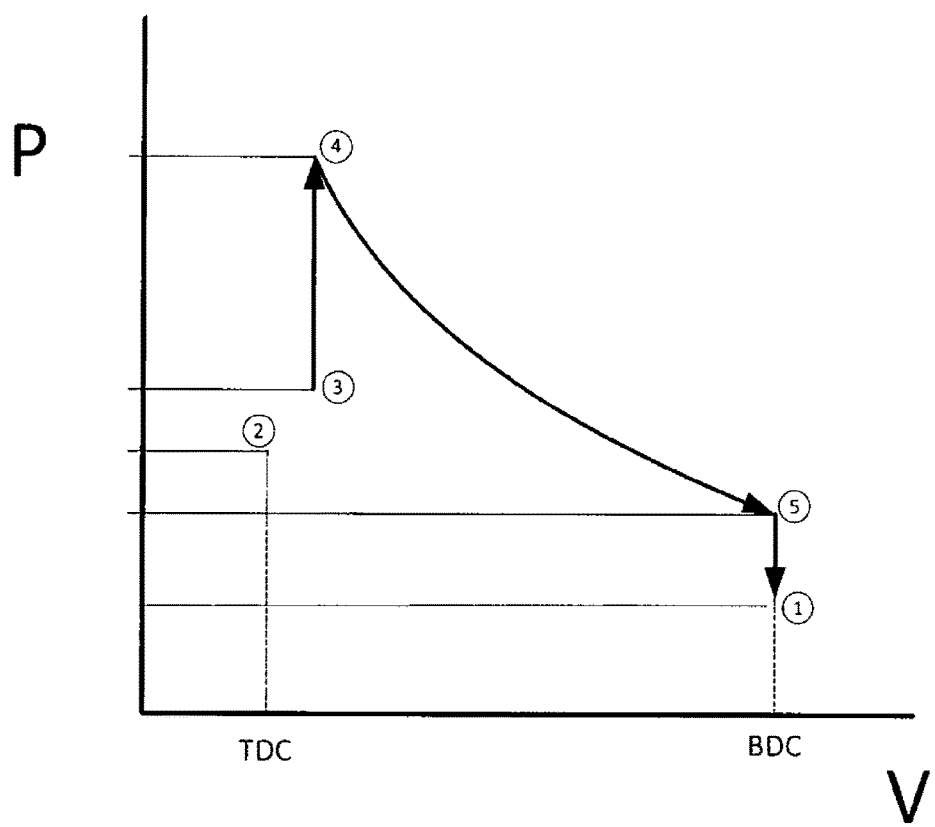
FIG. 13 is a pressure-volume diagram, illustrating the work done by an engine according to the present invention.

The Pressure-Volume diagram of FIG. 13 illustrates the work done by the engine, as the area bounded by the curve 1 to 5. This is in quite different from the curves of a typical petrol or diesel engine, illustrated in FIGS. 14 and 15 where the work done is less due to their lower efficiencies.

For In a typical Otto engine a 30% thermal efficiency can be achieved. In an HCCI engines, 60% can be theoretically delivered achieved based on actual experimentation, assuming the combustion chamber is divided into two enclosures wherein the volume of the primary chamber 3a has 1:1 ratio to the volume of secondary chamber 3b, then an overall thermal efficiency of 15% can be derived is derived.

$$\begin{aligned}
&\text{Engine efficiency gain compared to } Otto = \\
&\quad (\text{primary chamber \% volume} \times Otto + \\
&\quad \text{secondary chamber \% volume} \times HCCI) - Otto = \\
&\quad (0.5 \times 30\% + 0.5 \times 60\%) - 1.0 \times 30\% = (15\% + 30\%) - 30 = 15\%
\end{aligned}$$

The introduction of the primary chamber 3a serves another important purpose. During the combustion of the mixture in the secondary chamber 3b, the excessive peak pressures developed during this stage due to HCCI operation is absorbed in the primary chamber 3a. The primary chamber 3a; therefore, acts as a shock absorber which reduces the impact of the high peak pressures developed in the secondary chamber 3b during the main combustion event. Its effect in the operation is highly desirable because it reduces potential damages to components during HCCI combustion. HCCI ignition is known to produce peak pressures higher that most conventional engines.

The invention as described herein is applicable to internal combustion engines used in motor vehicles, ships, airplanes, power generating equipment, portable motorised tools and model cars. Furthermore, the invention can be used as a power plant for other forms of power generating unit.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by person skilled in the art that numerous variations and modification may be made to the above-described embodiment, without departing from the scope of the following claims. The present embodiments are; therefore, to be considered in all respected as illustrative and not restrictive.

The invention claimed is:

1. An engine block comprising a combustion chamber, an inlet for introducing a fuel/air mixture into the combustion chamber and an outlet for expelling combusted fuel/air mixture from the combustion chamber, a piston that reciprocates within the combustion chamber to compress the fuel/air mixture therein, and a reciprocating separator that separates the combustion chamber into a primary chamber and a secondary chamber, wherein the primary chamber is provided with an ignition source to initiate combustion in the primary chamber, which moves the reciprocating separator to compress and spontaneously combust the fuel/air mixture in the secondary chamber to drive the piston, wherein the reciprocating separator contains an aperture through which fuel/air mixture communicates between the secondary chamber and the primary chamber and the piston supports a closer that seals the secondary chamber by engaging the aperture.

2. The engine block of claim 1, wherein the reciprocating separator is adapted to move back and forth within the combustion chamber along a longitudinal axis of the combustion chamber.

3. The engine block of claim 1, wherein the reciprocating separator is configured to operably slide along the closer, to inversely vary a volume of the primary chamber with respect to a volume of the secondary chamber.

4. The engine block of claim 1, wherein the reciprocating separator is driven toward the piston by expansion of the combusting air/fuel mixture within the primary chamber.

5. The engine block of claim 1, wherein engagement between the closer and the reciprocating separator seals the primary chamber from the secondary chamber.

6. The engine block of claim 1, the inlet further comprising a valve, wherein variation of pressure within the combustion chamber moves the valve between an open position and a closed position.

7. The engine block of claim 1, wherein the inlet is disposed within the piston.

8. The engine block of claim 1, wherein the reciprocating separator further comprises an arresting mechanism, the arresting mechanism configured to decelerate the reciprocating separator within the combustion chamber.

9. The engine block of claim 8, wherein the arresting mechanism is pressure activated.

10. The engine block of claim 8, wherein the arresting mechanism comprises an arrestor movably housed within the reciprocating separator, such that the compression and subsequent combustion of the fuel/air mixture in the secondary chamber forces the arrestor to move relative to the reciprocating separator and into contact with a wall of the combustion chamber.

11. A hybrid ignition process for an engine, the process comprising: introducing a fuel/air mixture into a combustion chamber of the engine, wherein the combustion chamber comprises a primary chamber and a secondary chamber divided by a reciprocating separator; sealing the primary chamber from the secondary chamber by engaging a closer supported on a piston through an aperture disposed in the reciprocating separator to thereby seal the primary chamber from the secondary chamber; and igniting the fuel/air mixture in the primary chamber thereby driving the reciprocating separator to compress and spontaneously combust the fuel/air mixture in the secondary chamber to drive the piston.

12. The process of claim 11, including igniting the fuel/air mixture within the primary chamber by introducing heat into the primary chamber.

13. The process of claim 11, including igniting the fuel/air mixture within the primary chamber by introducing a spark into the primary chamber.

14. The process of claim 11, including igniting the fuel/air mixture within the primary chamber by compressing the fuel/air mixture in the primary chamber.

15. The process of claim 11, including isolating the fuel/air mixture within the secondary chamber from the spark in the primary chamber.

16. The process of claim 11, including igniting the fuel/air mixture within the secondary chamber by auto-ignition.

* * * * *